(12) United States Patent
Krapp et al.

(10) Patent No.: US 12,163,727 B2
(45) Date of Patent: Dec. 10, 2024

(54) DOMESTIC REFRIGERATION DEVICE

(71) Applicant: BSH Hausgeraete GmbH, Munich (DE)

(72) Inventors: Michael Krapp, Nattheim (DE); Alexander Ruppert, Senden (DE); Dominik Schiffner, Gerstetten (DE)

(73) Assignee: BSH Hausgeraete GmbH, Munich (DE)

( * ) Notice: Subject to any disclaimer, the term of this patent is extended or adjusted under 35 U.S.C. 154(b) by 262 days.

(21) Appl. No.: 17/769,822

(22) PCT Filed: Sep. 24, 2020

(86) PCT No.: PCT/EP2020/076725
§ 371 (c)(1),
(2) Date: Apr. 18, 2022

(87) PCT Pub. No.: WO2021/073849
PCT Pub. Date: Apr. 22, 2021

(65) Prior Publication Data
US 2022/0381506 A1 Dec. 1, 2022

(30) Foreign Application Priority Data
Oct. 18, 2019 (DE) .................... 10 2019 216 094.8

(51) Int. Cl.
*F25D 23/06* (2006.01)

(52) U.S. Cl.
CPC ......... *F25D 23/065* (2013.01); *F25D 23/063* (2013.01); *F25D 2201/12* (2013.01); *F25D 2323/06* (2013.01)

(58) Field of Classification Search
CPC ... F25D 23/065; F25D 23/062; F25D 2323/06
See application file for complete search history.

(56) References Cited

U.S. PATENT DOCUMENTS

| | | | | |
|---|---|---|---|---|
| 4,580,852 A | * | 4/1986 | Smitte | F25D 23/062 |
| | | | | 312/406.2 |
| 4,694,553 A | * | 9/1987 | Tate, Jr. | F25D 23/065 |
| | | | | 29/445 |
| 6,224,179 B1 | * | 5/2001 | Wenning | F25D 23/065 |
| | | | | 312/409 |
| 6,341,830 B1 | * | 1/2002 | Chun | F25D 23/063 |
| | | | | 312/401 |
| 9,285,157 B2 | * | 3/2016 | Selin | F25D 19/00 |

(Continued)

FOREIGN PATENT DOCUMENTS

| | | |
|---|---|---|
| CN | 102037296 A | 4/2011 |
| CN | 102452522 A | 5/2012 |

(Continued)

*Primary Examiner* — Daniel J Rohrhoff
(74) *Attorney, Agent, or Firm* — LAurence A. Greenberg; Werner H. Stemer; Ralph E. Locher

(57) ABSTRACT

A domestic refrigeration appliance apparatus includes at least one side wall component and at least one machine compartment top wall. In order to simplify assembly, the domestic refrigeration appliance apparatus has at least one sealing element which seals at least one region between the side wall component and the machine compartment top wall. A method for assembling a household refrigeration appliance apparatus is also provided.

14 Claims, 9 Drawing Sheets

(56) References Cited

U.S. PATENT DOCUMENTS

| | | | |
|---|---|---|---|
| 9,810,474 B2* | 11/2017 | Fernandez | F25D 23/006 |
| 10,969,158 B2 | 4/2021 | Lindel et al. | |
| 11,391,506 B2* | 7/2022 | Beckner | B21D 39/031 |
| 2002/0124590 A1 | 9/2002 | Rudick | |
| 2003/0141793 A1* | 7/2003 | Lee | F25D 23/063 |
| | | | 312/401 |
| 2005/0217301 A1 | 10/2005 | Iguchi et al. | |
| 2018/0087825 A1* | 3/2018 | Ehninger | F25C 5/182 |
| 2020/0072525 A1* | 3/2020 | Makoto | F25D 23/003 |
| 2020/0141629 A1* | 5/2020 | Seo | F25D 23/067 |
| 2021/0190411 A1* | 6/2021 | Krapp | F25D 23/065 |

FOREIGN PATENT DOCUMENTS

| | | |
|---|---|---|
| CN | 103676039 A | 3/2014 |
| CN | 108168187 A | 6/2018 |
| CN | 108700369 A | 10/2018 |
| CN | 190312977 A | 2/2019 |
| DE | 102010002043 A1 | 8/2011 |
| TW | 201228900 A | 7/2012 |
| WO | 9508087 A1 | 3/1995 |

\* cited by examiner

DOMESTIC REFRIGERATION DEVICE

FIELD AND BACKGROUND OF THE INVENTION

The invention relates to a household refrigeration appliance apparatus having at least one side wall component and at least one machine compartment top wall and a method for assembling a household refrigeration appliance apparatus which has at least one side wall component and at least one machine compartment top wall.

The prior art already discloses a household refrigeration appliance which has a side wall component and a machine compartment top wall. The machine compartment top wall is designed as a paperboard base that is coated on two sides and defines at least in part an insulation space. The insulation space is filled with an insulating foam during assembly. The household refrigeration appliance has two side wall components and a foam cross-piece which is screwed in one of the side wall components in each case and is arranged in a laminar manner to the rear of the machine compartment top wall which is otherwise essentially flexible. For reasons related to stability and to ensure the required leak-tightness of the foam, the foam cross-piece is adhesively bonded to the machine compartment top wall.

The object of the invention is in particular, without being limited thereto, to provide a generic apparatus having improved characteristics with respect to assembly while complying with relevant fire prevention regulations. The object is achieved in accordance with the invention by the features of the independent claims, whereas advantageous embodiments and developments of the invention are apparent in the subclaims.

The invention is based on a household refrigeration appliance apparatus having at least one side wall component and having at least one machine compartment top wall.

It is proposed that the household refrigeration appliance apparatus has at least one sealing element which seals at least one region between the side wall component and the machine compartment top wall.

A design of this type renders it possible to advantageously develop in particular a generic apparatus, in particular with respect to assembly and in fact in particular with respect to the safety of an operator and/or with respect to complying with relevant regulations, in particular with respect to fire prevention regulations, in particular the requirements laid down in IEC 60335-2-24. In particular, it is possible to provide a household refrigeration appliance that complies with the standards. In particular, it is possible to comply with at least one standard in a cost-effective manner. It is possible in particular to forego the costly assembling of a foam cross-piece. In particular, is possible to forego a foam cross-piece since the machine compartment top wall can assume in particular the function with respect to stability and the leak-tightness of the foam, which function has hitherto been provided by a foam cross-piece. In particular, the side wall component can be designed as a cost-effective plastic injection molded part. It is possible in particular to forego designing the side wall component from a higher quality and/or fireproof material, whereby in particular it is possible to achieve low costs and/or an advantageously economical embodiment. In particular, it is rendered possible for the machine compartment top wall to be assembled on the side wall components and/or on a wall in a simple and/or rapid manner. In particular, the sealing element renders it possible in particular to perform the assembly process in an automated manner. Advantageously, the sealing element can compensate any possible manufacturing tolerances, in particular with respect to the automated assembly process. This renders it possible to achieve in particular short assembly times and/or low personnel costs. Advantageously, the embodiment in accordance with the invention renders it possible during an assembly to forego an additional fixing of the machine compartment top wall to the side wall component and/or to a side wall. In particular, the embodiment in accordance with the invention renders it possible to achieve an improved sealing effect, in particular when filling an insulation space with foam.

The term a 'household refrigeration appliance apparatus' is to be understood to mean in particular a part, in particular a sub-assembly, of a household refrigeration appliance. In particular, the household refrigeration appliance apparatus can also comprise the entire household refrigeration appliance. The household refrigeration appliance is particularly advantageously provided so as in at least one operating mode to cool refrigerated goods, in particular foodstuffs such as for example drinks, meat, fish, milk and/or dairy products, in particular in order to extend the shelf life of the refrigerated goods. The household refrigeration appliance can be in particular a chest freezer and advantageously an upright refrigerator and/or freezer.

In particular, the household refrigeration appliance apparatus has an appliance body. The term an 'appliance body' is to be understood in particular to mean a unit that forms in at least one assembled state a part, in particular a large part, of an outer delimitation, in particular of a housing, advantageously of a household refrigeration appliance housing. The appliance body has in particular an outer housing and an inner liner which is arranged within the outer housing. The inner liner provides an outer delimitation in particular of a cold compartment, in particular of a refrigeration compartment and/or of a freezer compartment. The appliance body has in particular at least one side wall, in particular at least two side walls, and/or at least one rear wall and/or at least one top wall and/or at least one base wall.

In particular, the household refrigeration appliance apparatus has an insulation space. The term an 'insulation space' is to be understood to mean in particular a space between the inner liner and the outer housing which is filled in particular in at least one assembled state at least in part, advantageously at least to a large extent and particularly preferably completely, with at least one thermally insulating material, advantageously with at least one thermally insulating foam in order in particular to ensure a thermal separation between the cold compartment and an environment. The expression 'at least to a large extent' is to be understood to mean in particular a portion, in particular a mass portion and/or a volume portion, of at least 70%, in particular of at least 80%, advantageously of at least 90% and preferably of at least 95%.

The household refrigeration appliance apparatus has in particular a machine compartment. The machine compartment is provided so as in particular to receive cooling circuit components, such as for example a compressor and/or a valve and/or an electronic system and/or a fan. The machine compartment is, in particular starting from a geometric central point and/or a center of gravity of the machine compartment, open and/or not defined in particular in at least one direction in order to render possible accessibility to the machine compartment and/or to ensure in particular accessibility to the machine compartment. In an installed position, the machine compartment is arranged in particular at least to a large extent below the machine compartment top wall.

The machine compartment top wall defines in particular the machine compartment at least in part. In particular, the machine compartment top wall in at least one assembled state connects two side walls and/or a side wall and the rear wall. The machine compartment top wall can form an entire wall that defines the machine compartment. For example, the wall element could form at least one section of a side wall and/or of a rear wall and/or of a top wall and/or of a base wall of the appliance body. In at least one assembled state, the machine compartment top wall is arranged in contact at least in sections with the thermally insulating material. In particular, the wall element is designed as a base wall that defines the insulation space at least in part and/or as a top wall that defines a machine compartment in part. The machine compartment top wall advantageously prevents flames spreading in the direction of the insulation space.

The household refrigeration appliance apparatus advantageously has at least two side wall components. The term a 'side wall component' is to be understood to mean in particular a component, which is attached to the side wall, and/or a part of the side wall. The side wall component is in particular provided so as to produce at least in part a mechanical, in particular a non-positive and/or a materially bonded and/or a positive, connection between the side wall and the machine compartment top wall. The side wall component fixes the machine compartment top wall in particular at least essentially relative to the side wall. The side wall component is in particular arranged on a side wall which is in particular part of the appliance body of the household refrigeration appliance apparatus. In particular, the side wall component is attached by means of a latching connection, screw connection or a pressure connection to the side wall. The side wall component could alternatively be connected as one piece with the side wall and/or be designed as a part of the side wall. The side wall component can be designed as one piece. It is preferred that the side wall component is produced from a plastic, in particular in an injection molding process. The term 'one-piece' is to be understood to mean in particular at least materially bonded, for example by a welding process, an adhesive bonding process, an injection process and/or another process that appears expedient to the person skilled in the art, and/or advantageously formed as one piece, such as for example by producing it from one molding and/or by producing it in a single or multiple component(s) injection process and advantageously from a single blank.

The expression a 'region between the side wall component and the machine compartment top wall' is to be understood to mean in particular a volume between the side wall component and the machine compartment top wall. Advantageously, it is to be understood to mean a volume between an area surrounding an edge region of the machine compartment top wall and the side wall component. In an assembled state, a spacing between the side wall component and the machine compartment top wall amounts for example to a maximum of 20 mm, in particular a maximum of 15 mm, advantageously a maximum of 10 mm, particularly advantageously a maximum of 5 mm, preferably a maximum of 3 mm and particularly preferably a maximum of 1 mm.

Advantageously, the sealing element seals the region between the side wall component and the machine component top wall without a gap. The expression that the sealing element 'seals' at least one region between the side wall component and the machine compartment top wall is to be understood to mean in particular that the sealing element is provided so as to prevent material, in particular the thermally insulating material, flowing out of the insulation space into the machine compartment in particular while filling the insulation space with foam. In particular, the sealing element protects the machine compartment against thermally insulating material and/or other materials penetrating the machine compartment while filling the insulation space with foam. In particular, the sealing element is provided so as together with the machine compartment top wall to provide a foam barrier while the insulation space is being filled with thermally insulating material, in particular with foam.

The term 'provided' is to be understood to mean in particular especially designed and/or equipped. This is to be understood to mean that an object is provided for a specific function, that the object fulfills and/or performs this specific function in at least one application mode and/or operating mode.

For example, the machine compartment top wall could be designed to be flexible. However, if the machine compartment top wall is designed to be essentially bend-resistant, it is possible to achieve in particular a high degree of mechanical stability, whereby in particular it is possible to forego an additional component that supports in particular the stability, in particular to forego a foam crosspiece. The expression that the machine compartment top wall 'is designed to be essentially bend-resistant' is to be understood to mean in particular that under a mechanical loading, in particular as the machine compartment top wall is being assembled and/or while filling with foam, the machine compartment top wall does not experience any visible deformation which—in contrast to a unidirectional compression or expansion of the component—changes a curvature of the machine compartment top wall with respect to a direction of extent. In particular, this is to be understood to mean that under a mechanical loading of the machine compartment top wall, a curvature of the machine compartment top wall with respect to a main direction of extent amounts to a maximum of 10%, advantageously a maximum of 5%, particularly advantageously a maximum of 3%, preferably a maximum of 1% and particularly preferably a maximum of 0.5%. The expression a 'mechanical loading of the machine compartment top wall' is to be understood to mean in particular a flexural modulus that acts on the machine compartment top wall.

Advantageously, the machine compartment top wall is designed to be essentially fireproof. The expression that the machine compartment top wall 'is essentially fireproof' is to be understood to mean that the machine compartment top wall is formed from a non-flammable material and/or materials. In particular, the machine compartment top wall is provided so as to withstand a temperature of at least 400° C., advantageously at least 600° C., particularly advantageously at least 800° C., preferably at least 1000° C. and particularly preferably at least 1200° C., and in particular to catch fire. In particular, the machine compartment top wall is protected against a fire in particular in cooling circuit components, such as for example a compressor and/or an electronic system and/or a fan, and/or protects the insulation space. An embodiment of this type renders it possible to achieve in particular a high degree of fire protection. Advantageously, it is possible using said embodiment to comply with at least one standard and/or to provide a household refrigeration appliance apparatus that complies with a standard.

As is known in particular from the prior art, the machine compartment top wall could consist of a coated paperboard that is coated in particular with a metal. Alternatively or in addition thereto, the machine compartment top wall could consist of a plastic, for example. It is preferred that the machine compartment top wall consists at least to a large extent and in particular completely of metal. It is particularly preferred that the machine compartment top wall is made at least to a large extent and in particular completely from a galvanized steel plate. In particular, the machine compartment top wall is formed from a galvanized steel plate that has a material thickness of a maximum of 2 mm, advantageously a maximum of 1 mm, particularly advantageously a maximum of 0.6 mm and preferably a maximum of 0.5 mm. In particular, the machine compartment top wall consists of a galvanized steel plate having a material thickness of at least 0.1 mm, advantageously at least 0.2 mm, particularly advantageously at least 0.3 mm and preferably at least 0.4 mm. This renders it possible to provide a particularly stable machine compartment top wall. In particular, this renders it possible to achieve advantageous characteristics with respect to the fire protection of the machine compartment top wall.

Moreover, it is proposed that the sealing element grips around the machine compartment top wall at least in part. The expression that the sealing element 'grips around at least in part' the machine compartment top wall is to be understood to mean that the sealing element extends in an edge region of the machine compartment top wall from a surface of the machine compartment top wall that is facing the machine compartment at least as far as a surface that is facing the insulation space, and in fact preferably as one piece. The sealing element can accordingly have an at least essentially U-shaped profile in an assembled state. In particular, it is possible thereby to achieve an advantageous sealing. In addition, it is possible as a result to achieve a particularly simplified assembly of the household refrigeration appliance apparatus.

In addition, it is proposed that the side wall component has at least one receiving region for the machine compartment top wall and at least one guiding element which is provided so as to guide the machine compartment top wall into the receiving region during an assembly. The receiving region is provided so as to receive at least in part in particular the machine compartment top wall, in particular at least one edge region of the machine compartment top wall, in at least one assembled state. The receiving region is designed in particular as a groove. The guiding element is designed in particular as a contact surface. In particular the guiding element is designed as a contact surface that is arranged directly on the receiving region and is connected as one piece to the receiving region. Advantageously, the guiding element is designed as an extension of one of two limbs of the receiving region, said extension being formed as one piece on the receiving region. The expression that the guiding element is provided so as 'to guide into the receiving region' the machine compartment top wall is to be understood to mean in particular that the guiding element provides in particular a guiding force that during an assembly acts on the machine compartment top wall. The term 'guiding force' is in this case to define in particular a force that is provided so as to prevent the machine compartment top wall moving in at least one direction and/or to keep the machine compartment top wall during a movement in a direction that is predetermined by means of an effect of the force on the machine compartment top wall. An embodiment of this type renders it possible to perform the assembly in particular in a particularly simple manner. In particular, it is possible to achieve a particularly simple handling of the machine compartment top wall.

For example, the sealing element could be designed as an elastic sealing profile and/or as a rubber profile. Alternatively or in addition thereto, the sealing element could be designed as a beading, in particular as a beading profile and/or it could be made for example from rubber and/or caoutchouc. Alternatively or in addition thereto, the sealing element could be made from a foam material, for example. Alternatively or in addition thereto, the sealing element could be made from silicone and in particular be designed as a silicone bead. Advantageously, the sealing element is designed as a sealing foam, whereby in particular a particularly cost-effective sealing element can be provided. Advantageously, the sealing element is made at least essentially from a polyurethane foam. It is preferred that the sealing foam is provided so as to be foamed directly into the receiving region.

Moreover, it is proposed that the machine compartment top wall has at least one latching element that latches with a corresponding latching element of the side wall component. This renders it possible to perform an assembly in an advantageous manner, in particular to perform a pre-assembly in an advantageous manner. The machine compartment top wall could alternatively be connected to the side wall component by means of a screw connection and/or a riveted connection and/or a tongue and groove connection and/or a clamp connection and/or a further connection that appears expedient to the person skilled in the art, and/or in a materially bonded manner to the other element, for example by a welding process, an adhesive bonding process, an injection process and/or another process that appears expedient to the person skilled in the art.

For example, the machine compartment top wall could be attached to a rear wall and/or to a base plate of the household refrigeration appliance apparatus. The household refrigeration appliance apparatus has in particular at least one side wall and the machine compartment top wall is attached to said side wall. This renders it possible to provide an in particular especially stable construction and advantageously to perform the assembly in a simple manner. For example, the machine compartment top wall could be connected to the side wall by means of a riveted connection and/or a latching connection and/or a tongue and groove connection and/or a clamp connection and/or a screw connection. Alternatively or in addition thereto, the machine compartment top wall could be connected in a materially bonded manner to the side wall, for example by a welding process, an adhesive bonding process, an injection process and/or another process that appears expedient to the person skilled in the art. Advantageously, the machine compartment top wall is attached to the side wall by means of deforming the machine compartment top wall and/or the side wall, in particular by means of pushing through, whereby it is possible to achieve a particularly cost-effective attachment.

Moreover, the invention is based on the method for assembling a household refrigeration appliance apparatus which has at least one side wall component and at least one machine compartment top wall.

It is proposed that at least one region between the side wall component and the machine compartment top wall is sealed by means of a sealing element. This renders it possible in particular to simplify the assembly. In particular, characteristics of the household refrigeration appliance apparatus can be improved with respect to safety, in particular with respect to fire protection.

The expression that a region between the side wall component and the machine compartment top wall is sealed 'by means of a sealing element' is to be understood to mean in particular that in at least one assembly step a sealing element is arranged in a region between the machine compartment top wall and the side wall component. Advantageously, the sealing element is attached to the machine compartment top wall and/or in the receiving region of the side wall component, prior to the machine compartment top wall being connected to the side wall component and/or a side wall. For example, in at least one assembly step, the sealing element could be attached to the machine compartment top wall, in particular to an edge region of the machine compartment top wall. Advantageously, a sealing element that is designed in particular as a beading could be attached in particular to an edge region of the machine compartment top wall. In particular, the sealing element that is designed as a beading could have in particular a U-shaped design and in particular could be pressed onto the edge region of the machine compartment top wall, for example in a pre-assembly step, in particular an automated pre-assembly step. Particularly advantageously, a sealing element that is designed as a sealing foam could be inserted into the receiving region of the side wall component, for example in a pre-assembly step, in particular in an automated injection process. By way of assembling the household refrigeration appliance apparatus in this manner, it is possible in particular to reduce an outlay with regard to assembly. In particular, it is possible hereby to achieve in particular short assembly times and/or low personnel costs. In particular, it is possible in addition to achieve an improved sealing effect.

Moreover, it is proposed that the machine compartment top wall is connected to the side wall component. The expression that 'the machine compartment top wall is connected to the side wall component' is to be understood to mean in particular that the machine compartment top wall is connected in at least one assembly step in particular by way of at least one non-positive connection and/or at least one positive connection to the side wall component, for example by riveting and/or a latching connection and/or a tongue and groove connection and/or a clamp connection and/or any other connection that appears expedient to the person skilled in the art. For example, in particular the sealing element could provide a non-positive connection and/or a positive connection. Alternatively or in addition thereto, the machine compartment top wall could be connected to the side wall component, in that in particular holding forces are provided by the sealing element which act in particular on the machine compartment top wall and/or the side wall component, in particular in a manner relative to one another. If the household refrigeration appliance apparatus is mounted in this manner, it is possible to achieve an assembly in particular in a simple and/or cost-effective manner. In particular, it is possible to enable an at least partially automated assembly.

For example, the sealing element could be pressed onto the machine compartment top wall. Advantageously, the machine compartment top wall is pressed into the sealing element. The expression that 'the machine compartment top wall is pressed into the sealing element' is to be understood to mean in particular that the machine compartment top wall is moved relative to the sealing element, in particular in the direction of the sealing element. For example, the sealing element could be deformed as a result. Advantageously, by virtue of the fact that the machine compartment top wall is pressed into the sealing element, a region between the side wall component and the machine compartment top wall is filled with the sealing element in particular without a gap. This renders it possible in particular to reduce a number of assembly steps. In particular, by way of assembly in this manner, it is possible to compensate any possible manufacturing tolerances.

For example, the machine compartment top wall could be connected advantageously by way of at least one non-positive connection and/or at least one positive connection to at least one side wall, for example by way of a riveted connection and/or a latching connection and/or a tongue and groove connection and/or a clamp connection and/or a further connection that appears expedient to the person skilled in the art, and/or in a materially bonded manner to the other element, for example by a welding process, an adhesive bonding process and/or another process that appears expedient to the person skilled in the art.

Advantageously, the machine compartment top wall is connected to at least one side wall by means of a deforming process. The term a 'deforming process' can be understood to mean for example, without being limited thereto, pushing through and/or folding and/or riveting and/or folding and/or flanging. This renders it possible to advantageously forego an additional fixing element, whereby in particular it is possible to make the assembly simpler and/or more cost-effective.

The household refrigeration appliance apparatus is not to be limited hereby to the above described application and embodiment. In particular, so as to fulfill a function mode described herein, the household refrigeration appliance apparatus can have a number of individual elements, components and units that differs from a number thereof mentioned herein.

Further advantages are apparent in the following description of the drawing. Exemplary embodiments of the invention are illustrated in the drawing. The drawing, the description and the claims disclose numerous features in combination. The person skilled in the art will also consider the features in an expedient manner individually and combine them to form expedient further combinations.

DETAILED DESCRIPTION OF THE INVENTION

Figure 1:
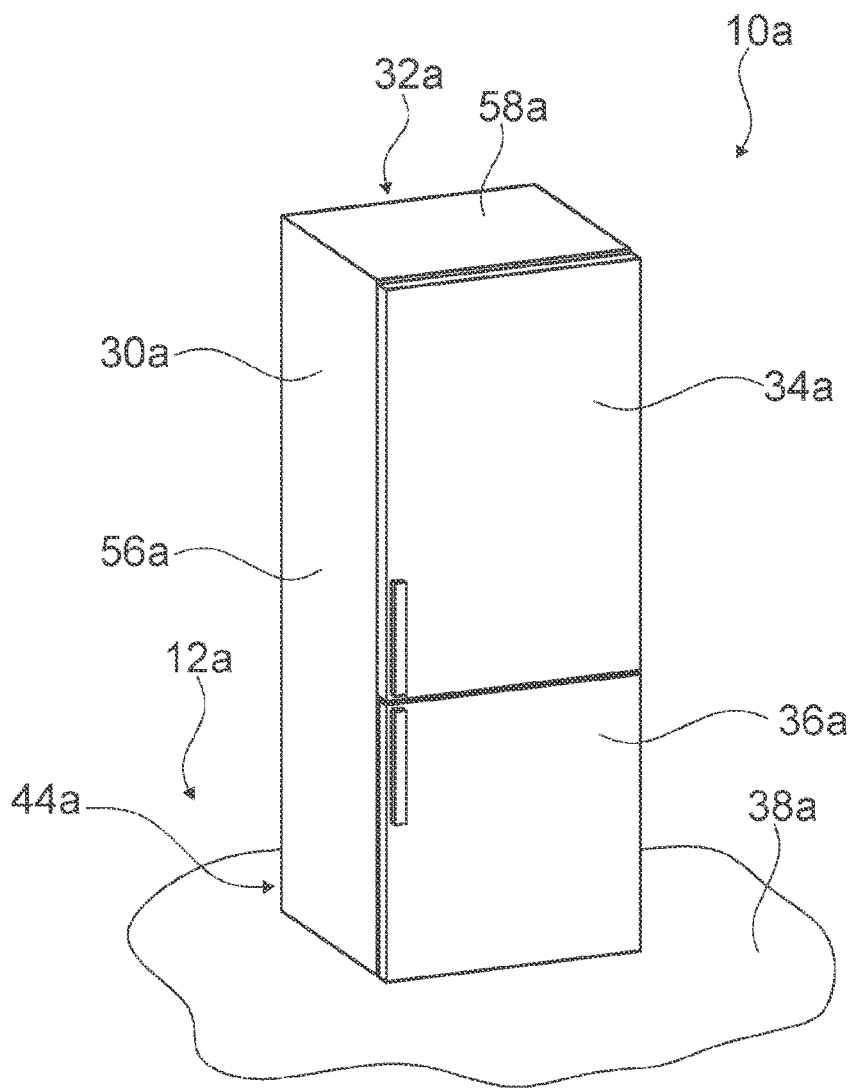
FIG. 1 shows a frontal view of a household refrigeration appliance having a household refrigeration appliance apparatus.

Of the objects that are present several times, only one is provided with a reference character in the figures in each case.

FIG. 1 illustrates a household refrigeration appliance 10a which is designed as a refrigerator-freezer combination appliance. The household refrigeration appliance 10a has a household refrigeration appliance apparatus 12a. The household refrigeration appliance apparatus 12a has an appliance body 32a. The appliance body 32a has an outer housing 56a and an inner liner 54a (cf. also FIG. 2). The appliance body 32a has two side walls 30a, a top wall 58a, a rear wall and a base wall (not illustrated).

The inner liner 54a defines in part a cold compartment (not illustrated). The cold compartment is designed as a refrigeration compartment. The household refrigeration appliance apparatus 12a has an appliance door 34a. The appliance door 34a is mounted in such a manner so as to be able to pivot relative to the appliance body 32a. In a closed state, the appliance door 32a seals the cold compartment.

The inner liner 54a defines in part a further cold compartment (not illustrated). The further cold compartment is designed as a freezer compartment. The household refrigeration appliance apparatus 12a has a further appliance door 36a. The further appliance door 36a is mounted in such a manner as to be able to pivot relative to the appliance body 32a. In a closed state, the further appliance door 36a seals the further cold compartment. The further cold compartment is arranged in an installed position with respect to a vertical direction below the cold compartment. However, a different number and arrangement of cold compartments would also be conceivable. In an installed position, the appliance body 32a is placed on a placement surface 38a.

Figure 2:
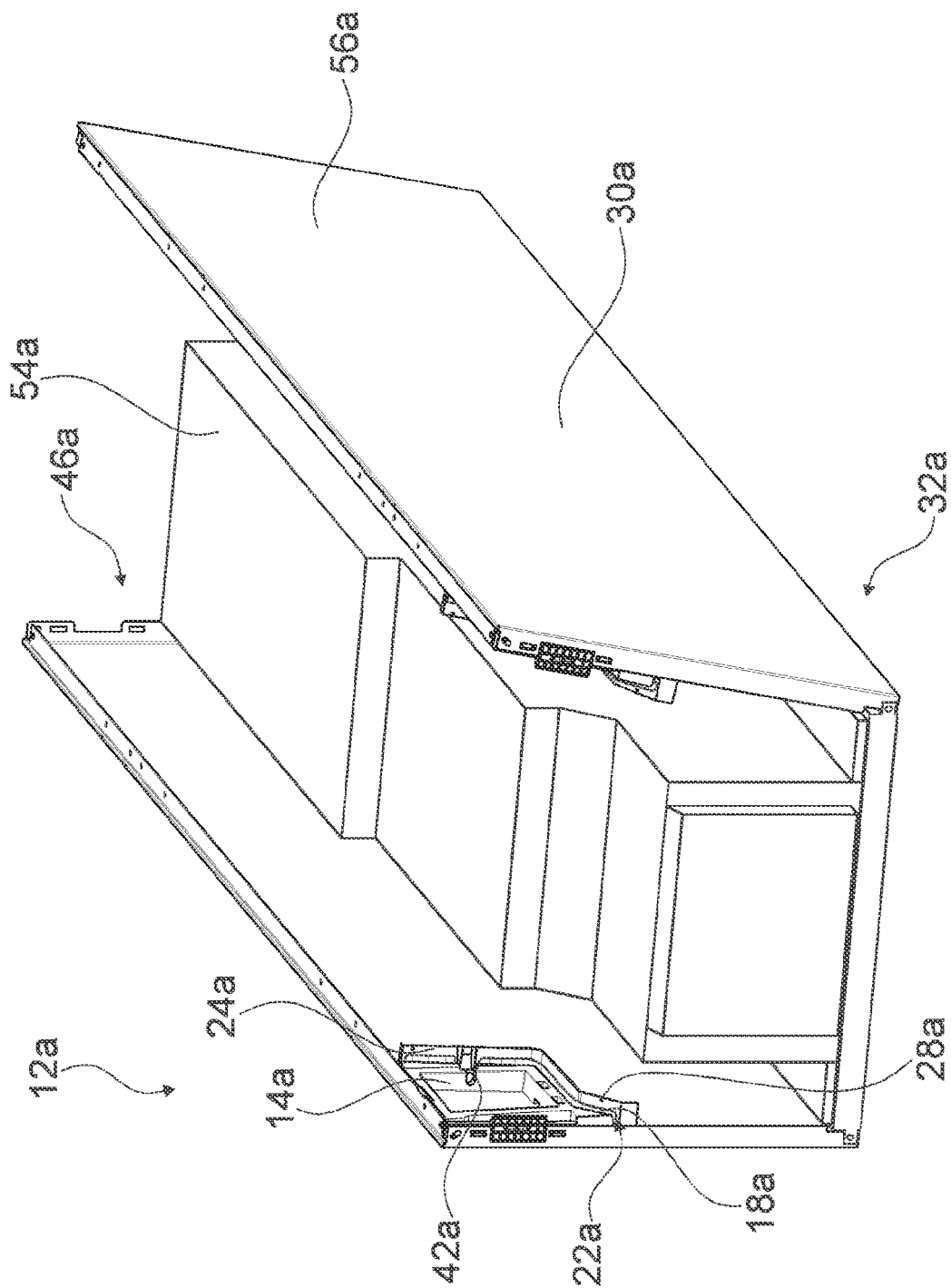
FIG. 2 shows a rear view of a part of the household refrigeration appliance apparatus having at least one side wall component and at least one sealing element in a pre-assembled state.

FIG. 2 illustrates a part of the household refrigeration appliance apparatus in a pre-assembled state. The household refrigeration appliance apparatus 12a has two side wall components 14a and a machine compartment top wall 16a (cf. FIGS. 2 and 3). In addition, the household refrigeration appliance apparatus 12a has a machine compartment 44a which is provided so as to receive in particular a compressor and/or other components of a cooling circuit of the household refrigeration appliance apparatus. The machine compartment top wall 16a defines the machine compartment 44a in part and in fact at least in the upward direction. The household refrigeration appliance apparatus 12a has an insulation space 46a. The machine compartment top wall 16a separates the machine compartment from the insulation space 46a. The side wall components 14a are arranged respectively on one of the side walls 30a. The side wall component 14a is latched to the respective side wall 30a.

Figure 3:
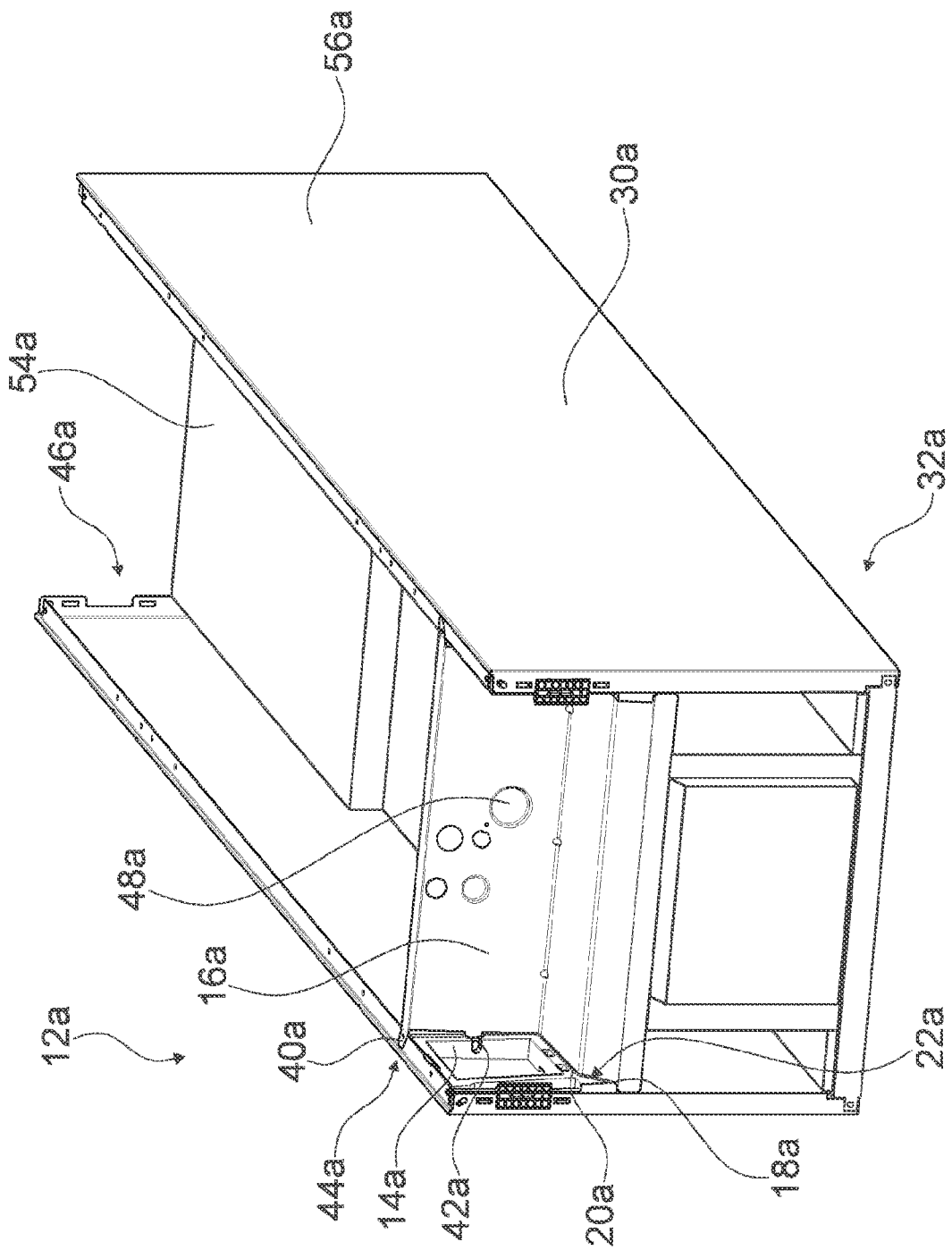
FIG. 3 shows a rear view of a part of the household refrigeration appliance apparatus having a machine compartment top wall.

The machine compartment top wall 16a is attached in each case to the two side walls 30a (cf. FIG. 3). The machine compartment top wall 16a has a bracket 40a. In an assembled state, the bracket 40a lies against an edge of the side wall 30a. In the illustrated example, the machine compartment top wall 16a is attached in each case to the side wall 30a by means of deforming the bracket 40a of the machine compartment top wall 16a and of the side wall 30a.

Figure 4:
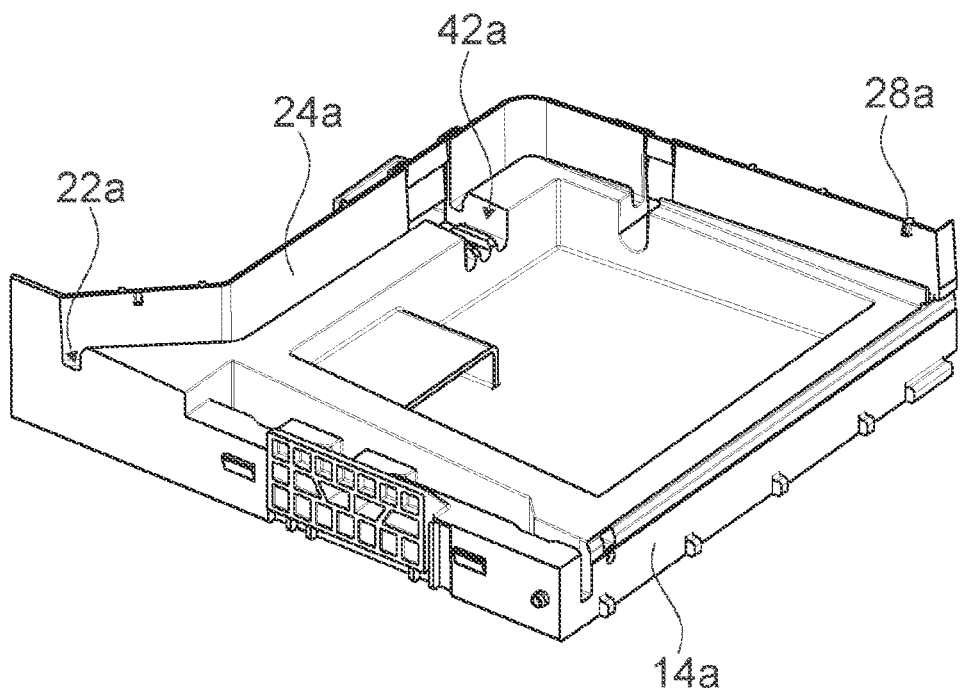
FIG. 4 shows a single illustration of a side wall component.
Figure 6:
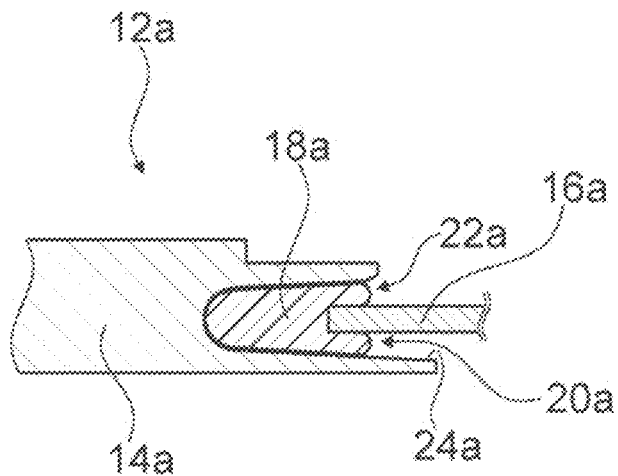
FIG. 6 shows a sectional view of a part of the household refrigeration appliance apparatus.

The household refrigeration appliance apparatus 12a has a sealing element 18a (cf. also FIG. 2). In an assembled state, the household refrigeration appliance apparatus 12a has a region 20a between the side wall component 14a and the machine compartment top wall 16a. The sealing element 18a is provided so as in an assembled state to seal the region 20a between the side wall component 14a and the machine compartment top wall 16a (cf. also FIG. 6). In the illustrated exemplary embodiment, the sealing element 18a is designed as a sealing foam (cf. FIGS. 2, 3 and 6). The sealing element 18a that is designed as a sealing foam grips around the machine compartment top wall 16a in an edge region of the machine compartment top wall 16a (cf. FIGS. 3 and 6), FIG. 4 illustrates the side wall component 14a of the household refrigeration appliance apparatus 12a in a perspective detailed view. The side wall component 14a is designed as a plastic part, in the illustrated example in particular as a plastic injection molded part.

The wall component 14a has a receiving region 22a which is provided so as in an assembled state to receive the machine compartment top wall 16a. The receiving region 22a is designed as a groove in the side wall component 14a. The side wall component 14a has a guiding element 24a which is provided so as to guide the machine compartment top wall 16a into the receiving region 22a during an assembly. The guiding element 24a is formed as a guiding surface which is created by extending a limb of the receiving region 22a that is designed as a groove.

Moreover, the side wall component 14a has four leadthroughs 42a. The lead-through 42a is provided so as to receive at least one cable and/or at least one pipe, in particular so as to lead from the machine compartment 44a through into the insulation space 46a. The lead-through 42a is formed as a groove in the side wall component 14a. Moreover, the side wall component 14a has two corresponding latching elements 28a, which are designed in the illustrated example as nipples are and are formed as one piece with the side wall a component 14a.

Figure 5:
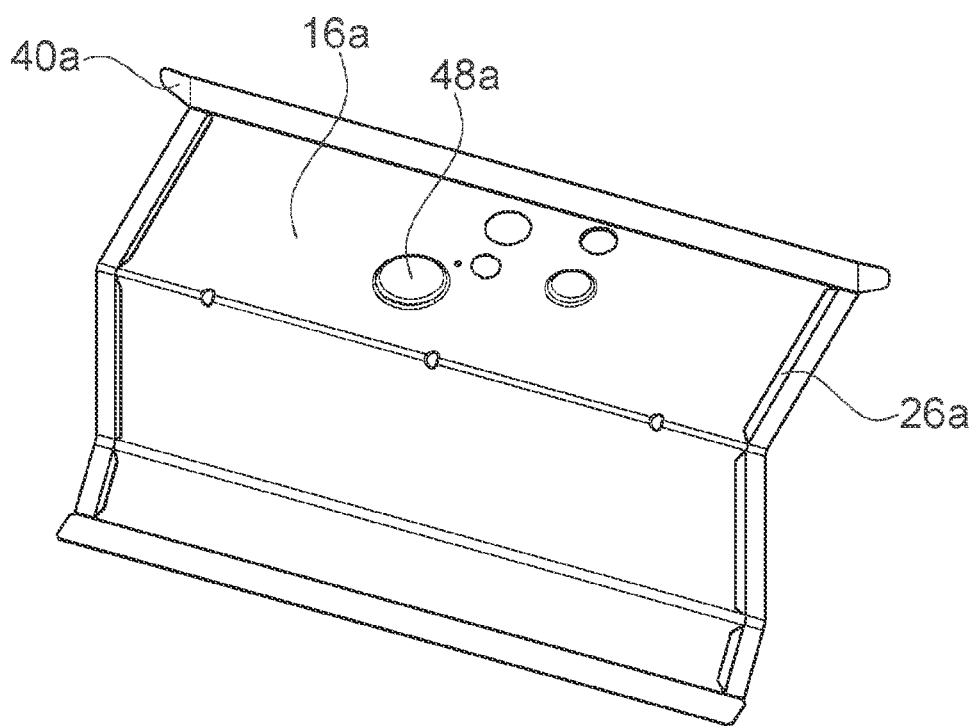
FIG. 5 shows a single illustration of a machine compartment top wall.

The machine compartment top wall 16a has six latching elements 26a which correspond to the corresponding latching elements 28a of the side wall component 14a (cf. FIG. 5). In an assembled state, the latching element 26a is provided so as to be latched with the corresponding latching element 28a of the side wall component 14a (cf. also FIGS. 3 and 5). The latching element 26a is designed as one piece with the machine compartment top wall 16a. In particular, the latching element 16a is formed by a bent bracket of the machine compartment top wall 16a.

The machine compartment top wall 16a has a plurality of cut-outs 48a. At least one cut-out 48a is provided so as in at least one assembly step to allow the insulation material that fills the insulation space 46a to pass through. In particular, at least one cut-out 48a is used as a through-passage for foam when the insulation space 46a is being filled with foam. At least one further cut-out 48a is provided so as in an assembled state to drain off into the machine compartment 44a condensate water that condenses in the cold compartment.

The machine compartment top wall 16a is formed from metal, in the illustrated example, the machine compartment top wall 16a is formed in particular from galvanized steel plate. The machine compartment top wall 16a is designed to be bend-resistant. In particular, the machine compartment top wall 16a is dimensionally stable when the insulation space 46a is being filled with foam and the household refrigeration appliance apparatus 10a is in an assembled state. In addition, the machine compartment top wall 16a is designed to be fireproof. In particular, the machine compartment top wall 16a complies with the requirements of the IEC 60335-2-24, particular with respect to fire prevention.

Figure 7:
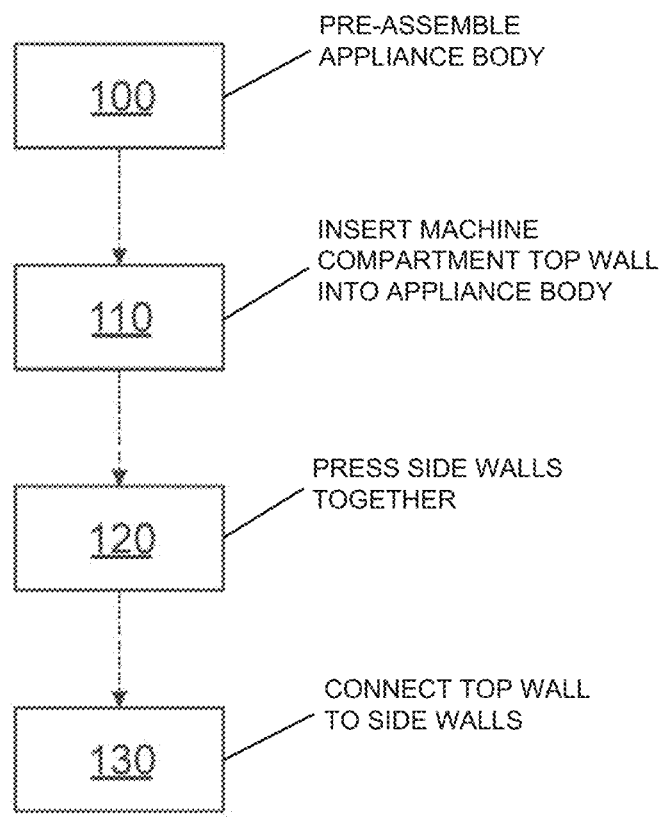
FIG. 7 shows a flow diagram of a method for assembling household refrigeration appliance apparatus.

FIG. 7 illustrates schematically a method for assembling a household refrigeration appliance apparatus 12a which has at least one side wall component 14a and at least one machine compartment top wall 16a. The method for assembling the household refrigeration appliance apparatus 12a comprises at least one assembly step 100, 110, 120 and 130 (cf. also FIGS. 8 to 11).

Figure 8:
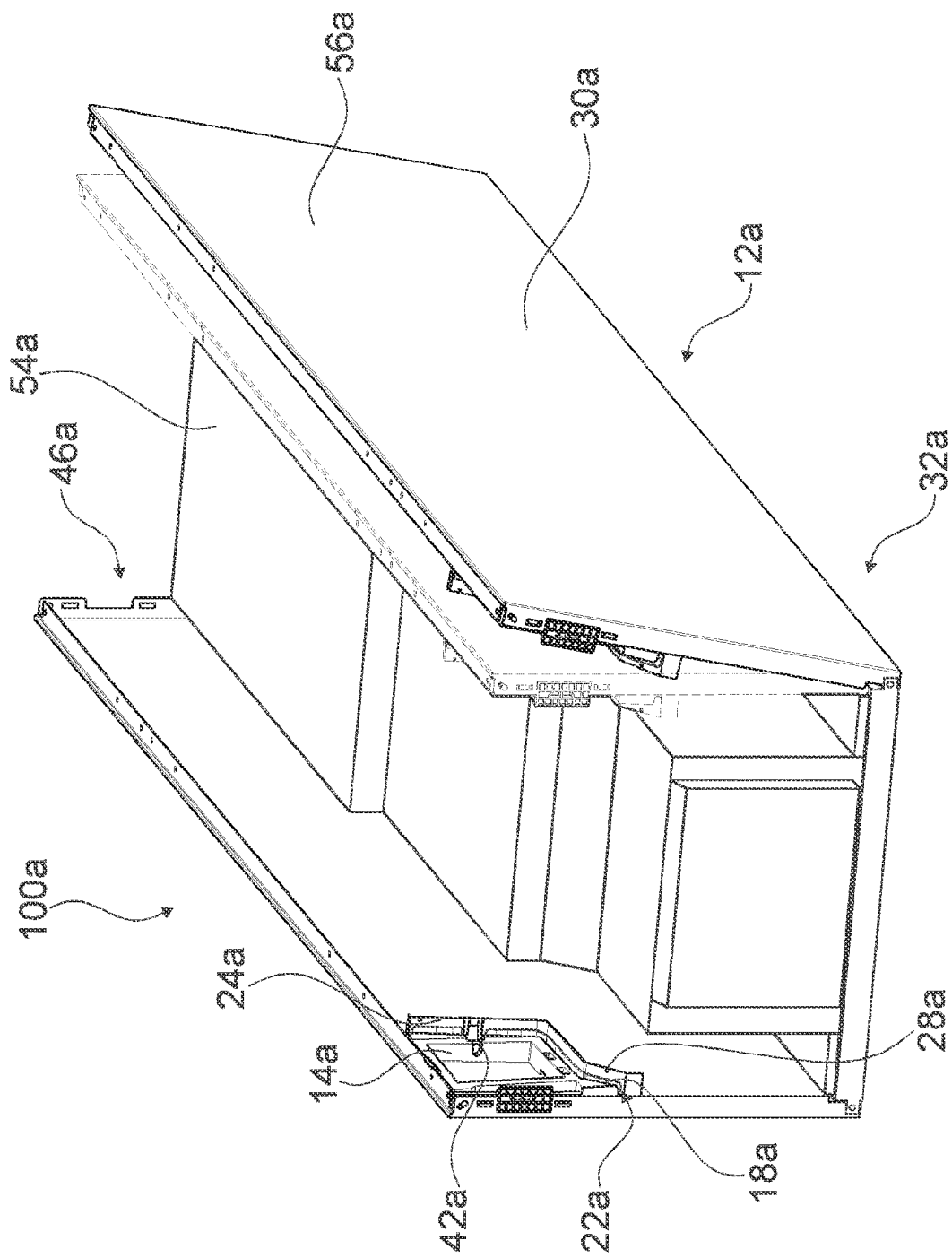
FIG. 8 shows a method step of the method for assembling the household refrigeration appliance apparatus.
Figure 9:
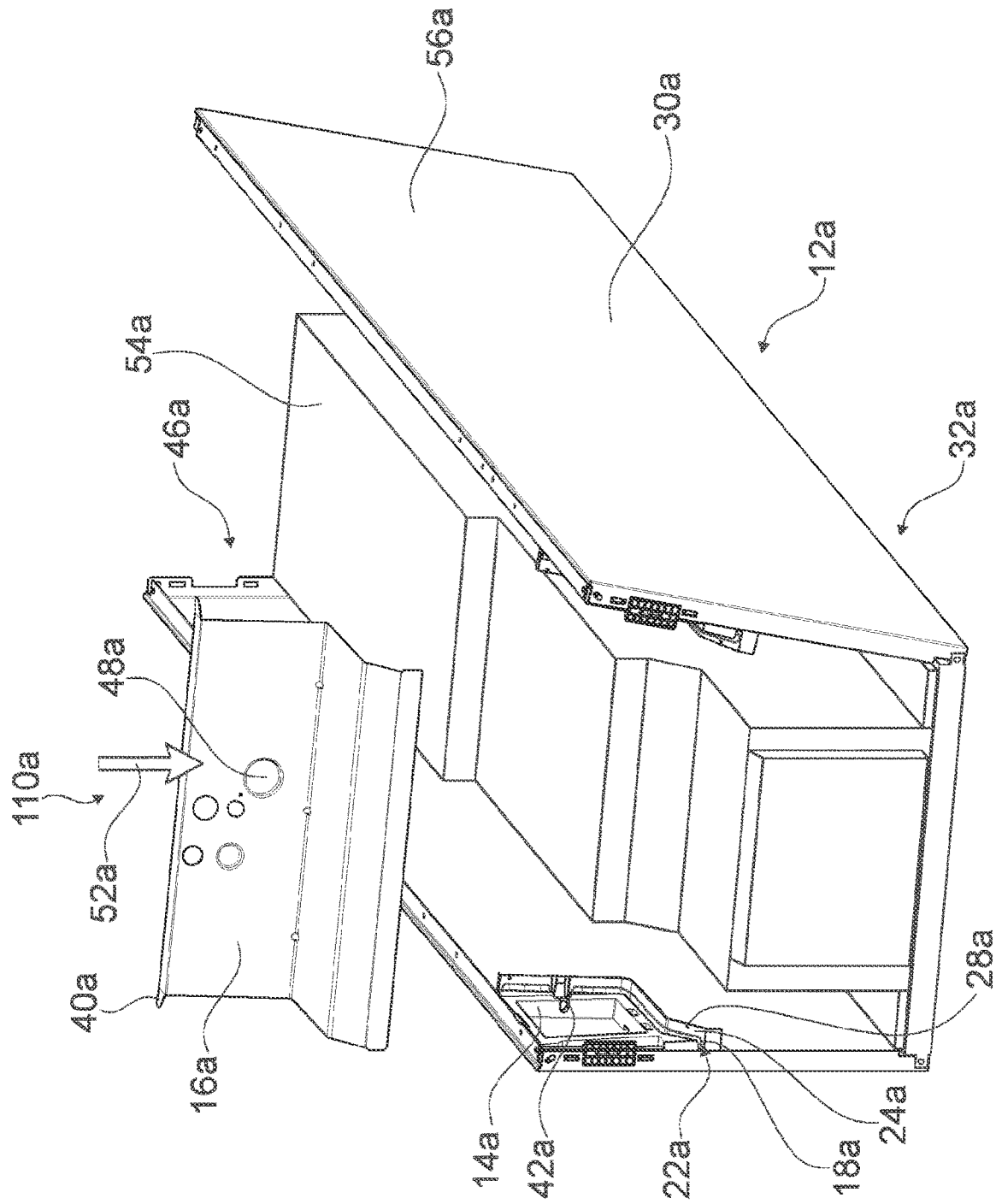
FIG. 9 shows a further method step of the method for assembling the household refrigeration appliance apparatus.

In the assembly step 100, the appliance body 32a is pre-assembled (cf. FIG. 8). In particular, the side walls 30a are moved into a pre-assembly position, wherein the side walls 30a are arranged at an angle with respect to one another. The side wall components 14a are respectively mounted on the side wall 30a. The side wall components 14a are latched with the side wall 30a in each case. The sealing element 18a is pre-assembled. For this purpose, the sealing element 18a, which is designed in the illustrated example as a sealing foam, is injected in an automated manner into the receiving region 22a of the side wall component 14a. In the assembly step 110, the machine compartment top wall 16a is inserted into the pre-assembled appliance body 32a, which is illustrated schematically by the insertion direction 52a (cf. FIG. 9). The machine compartment top wall 16a is placed in the insertion direction 52a on the guiding element 24a.

Figure 10:
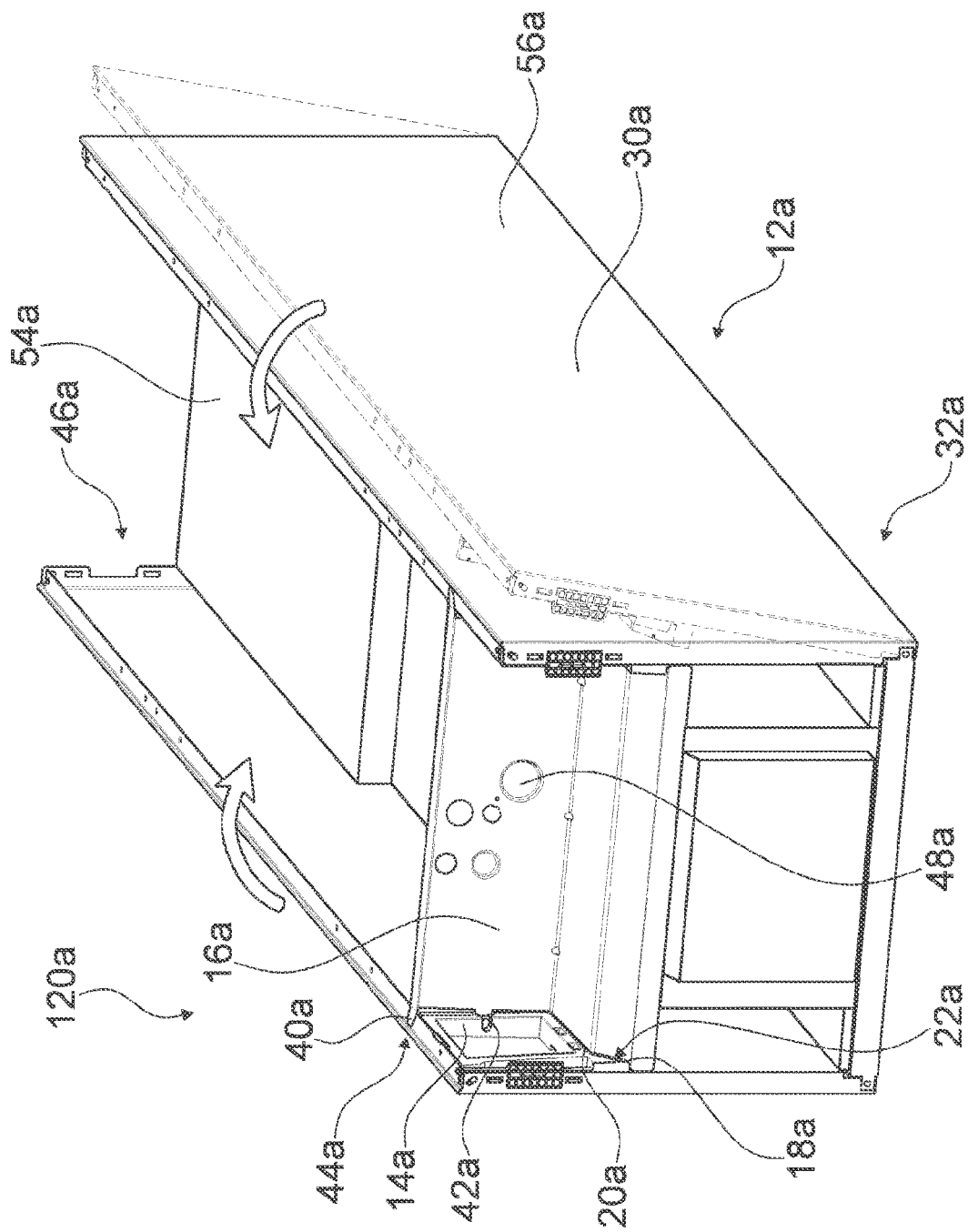
FIG. 10 shows a further method step of the method for assembling the household refrigeration appliance apparatus.

In the assembly step 120, the side walls 30a are pressed together relative to one another with the result that they are moved into a position in which they are oriented in a parallel manner with respect to one another (cf. FIG. 10). The machine compartment top wall 16a is thus connected to the side wall component 14a, whereby in particular the household refrigeration appliance apparatus is stabilized. In particular, the machine compartment top wall 16a latches with the side wall component 14a. By virtue of the fact that the side walls 30a are pressed together relative to one another, the machine compartment top wall 16a is pressed into the sealing element 18a that is arranged between the machine compartment top wall 16a and the side wall component 14a. This assembly step 120 causes the sealing element 18a to deform in a plastic manner. Consequently, in the assembly step 120a, the region 20a between the side wall component 14a and the machine compartment top wall 16a is filled by means of the sealing element 18a.

Figure 11:
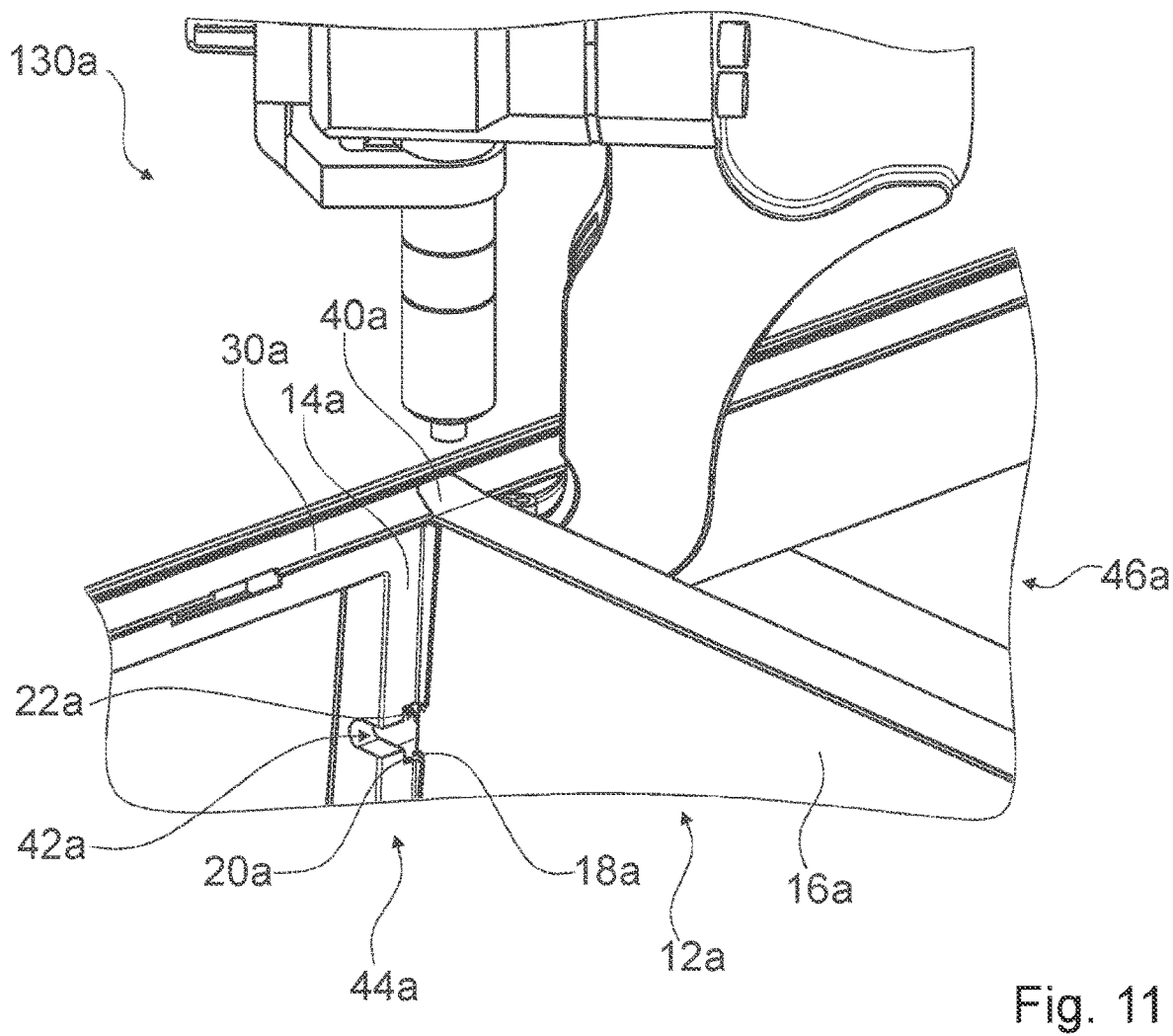
FIG. 11 shows a further method step of the method for assembling the household refrigeration appliance apparatus and FIG. 12 shows a sectional view of a part of an alternative exemplary embodiment of the household refrigeration appliance apparatus.

In the assembly step 130, the machine compartment top wall 16a is connected to two side walls 30a by means of a deforming process (cf. FIG. 11). The deforming process amounts to pushing through.

Figure 12:
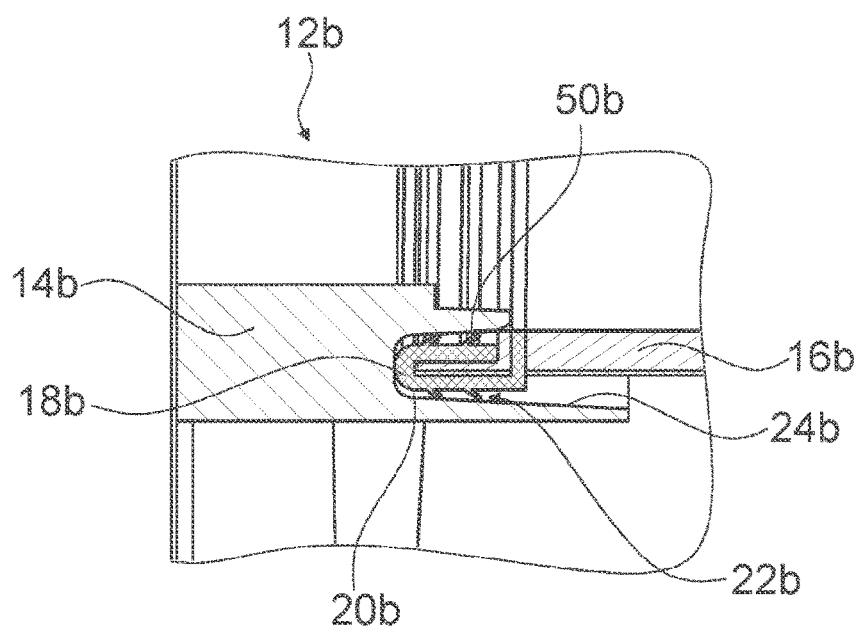

In FIG. 12, a further exemplary embodiment of the invention is illustrated. The description below is limited essentially to the differences between the exemplary embodiments, wherein, with regard to like components, features and functions, reference can be made to the description of the exemplary embodiment of FIGS. 1 to 11. In order to differentiate between the exemplary embodiments, the letter a that is attached to the reference character of the exemplary embodiment in the FIGS. 1 to 11 is replaced by the letter b in the case of the reference characters of the exemplary embodiment in FIG. 12. With respect to like-described components, in particular with respect to components having like reference characters, reference can also fundamentally be made to the drawings and/or, the description of the exemplary embodiment of FIGS. 1 to 11.

In the exemplary embodiment illustrated in FIG. 12, a household refrigeration appliance apparatus 12a has a sealing element 18b. The sealing element 18b is designed as a beading, in particular as a rubber beading. The sealing element 18b has a plurality of in particular four sealing lips 50b. The sealing lips 50b are provided so as to fix a machine compartment top wall 16b in addition in side wall components 14b. The sealing element 18b is provided so as to be mounted in at least one assembly step on an edge region of the machine compartment top wall 16b.

When the household refrigeration appliance apparatus 12b is being assembled, the sealing element 18b that is designed as a beading is plugged in one assembly step onto the edge of the machine compartment top wall 16b. In a subsequent assembly step, the machine compartment top wall 16b together with the already pre-assembled sealing element 18b is pushed into the side wall component 14b, in particular into a receiving region 22b of the side wall component 14b. In particular, during a foaming procedure, the sealing lips 50b deform in a plastic manner, whereby, the sealing lips 18b seal a region between the side wall component 14b and the machine compartment top wall 16b.

REFERENCE CHARACTERS

10 Household refrigeration appliance
12 Household refrigeration appliance apparatus
14 Side wall component
16 Machine compartment top wall
18 Sealing element
20 Region
22 Receiving region
24 Guiding element
26 Latching element
28 Corresponding latching element
30 Side wall
32 Appliance body
34 Appliance door
36 Further appliance door
38 Placement surface
40 Bracket
42 Lead-through
44 Machine compartment
46 Insulation space
48 Cut-out
50 Sealing lip
52 Insertion direction
54 Inner liner
56 Outer housing
58 Top wall
100 Assembly step
110 Assembly step
120 Assembly step
130 Assembly step

The invention claimed is:

1. A household refrigeration appliance apparatus, comprising:
   at least one side wall component;
   at least one machine compartment top wall; and
   at least one sealing element sealing at least one region between said at least one side wall component and said at least one machine compartment top wall;
   said at least one side wall component having a receiving region receiving said at least one machine compartment top wall and a guiding element for guiding said at least one machine compartment top wall into said receiving region during an assembly into an assembled state;
   said at least one side wall component having a latching element formed in one piece with said at least one side wall component, said latching element being formed as a protrusion protruding from said guiding element;
   said at least one machine compartment top wall having at least one latching element being formed as one component with said at least one machine compartment top wall and being formed by a bent bracket of said at least one machine compartment top wall; and said at least one latching element of said at least one machine compartment top wall being latched with said latching element of said at least one side wall component.

2. The household refrigeration appliance apparatus according to claim 1, wherein said at least one machine compartment top wall is bend-resistant.

3. The household refrigeration appliance apparatus according to claim 1, wherein said at least one machine compartment top wall is fireproof.

4. The household refrigeration appliance apparatus according to claim 1, wherein said at least one machine compartment top wall is formed more than half of metal.

5. The household refrigeration appliance apparatus according to claim 1, wherein said at least one sealing element at least partly grips around said at least one machine compartment top wall.

6. The household refrigeration appliance apparatus according to claim 1, wherein said at least one sealing element is a sealing foam.

7. The household refrigeration appliance apparatus according to claim 1, which further comprises at least one side wall, said at least one machine compartment top wall being attached to said at least one side wall.

8. The household refrigeration appliance apparatus according to claim 7, wherein at least one of said at least one machine compartment top wall or said at least one side wall is deformed for attaching said at least one machine compartment top wall to said at least one side wall.

9. A household refrigeration appliance or at least one of a freezer or a refrigerator, comprising at least one household refrigeration appliance apparatus according to claim 1.

10. A method for assembling a household refrigeration appliance apparatus, the method comprising:

providing the household refrigeration appliance apparatus according to claim 1; and using said sealing element to seal said at least one region between said at least one side wall component and said at least one machine compartment top wall.

11. The method according to claim 10, which further comprises connecting said at least one machine compartment top wall to said at least one side wall component.

12. The method according to claim 10, which further comprises pressing said at least one machine compartment top wall into said at least one sealing element.

13. The method according to claim 10, which further comprises using a deforming process to connect said at least one machine compartment top wall to at least one side wall.

14. A household refrigeration appliance apparatus, comprising:

at least one side wall component having a latching element;

at least one machine compartment top wall having at least one latching element corresponding to and being latched to said latching element of said at least one side wall component; and at least one sealing element, said at least one sealing element being an element separate from said at least one side wall component and separate from said at least one machine compartment top wall, said at least one sealing element sealing at least one region between said at least one side wall component and said at least one machine compartment top wall.

* * * * *